(12) United States Patent
Meyer et al.

(10) Patent No.: US 6,728,247 B1
(45) Date of Patent: Apr. 27, 2004

(54) METHOD AND DEVICE FOR INCREASING A DATA THROUGHPUT

(75) Inventors: Michael Meyer, Aachen (DE); Ashild Groenstadt, Langhus (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/311,065

(22) Filed: May 13, 1999

(30) Foreign Application Priority Data

May 13, 1998 (EP) .............................. 98108681

(51) Int. Cl.[7] .............................. H04J 12/56
(52) U.S. Cl. ...................................... 370/394
(58) Field of Search .............................. 370/473, 474, 370/464, 466, 469, 470, 329, 392, 394; 375/246; 348/461, 464, 465

(56) References Cited

U.S. PATENT DOCUMENTS

| | | | | |
|---|---|---|---|---|
| 5,127,000 A | * | 6/1992 | Henrion | 370/394 |
| 5,251,205 A | * | 10/1993 | Callon et al. | 370/392 |
| 5,446,736 A | * | 8/1995 | Gleeson et al. | 370/473 |
| 5,504,935 A | * | 4/1996 | Vercauteren | 455/438 |
| 5,642,354 A | * | 6/1997 | Spear | 370/329 |
| 5,708,655 A | * | 1/1998 | Toth et al. | 340/825.52 |
| 5,946,634 A | * | 8/1999 | Korpela | 370/466 |

OTHER PUBLICATIONS

"Technik der Netze", Chapter 6 by G. Siegmund et al., R.v. Decker's Verlag; Heidelberg 1996.

\* cited by examiner

*Primary Examiner*—Ajit Patel
*Assistant Examiner*—William Schultz

(57) ABSTRACT

The invention relates to a method and a device for increasing a data throughput in network applications for the transmission of data at high speed, for example, the internet, via a packet oriented cordless data network, for example, the GPRS network. The internet application provides for data in the form of data packets (n,n+1,n+2,n+3, . . . ). In case of transmission via the internet the data packets are transmitted via different paths, which is why the data packets are available to the GPRS network at an intermediate node in the wrong sequence. Also, data packets get lost, which upon a new request are available also in the wrong sequence. Due to a different bandwidth a number of data packets is available for transmission at the intermediate node of the GPRS network while a first data packet is transmitted. The sequence of the available data packets is determined and the data packets are sorted for being available for transmission in a sorted sequence.

14 Claims, 6 Drawing Sheets

METHOD AND DEVICE FOR INCREASING A DATA THROUGHPUT

This application claims priority under 35 U.S.C. §§ 119 and/or 365 to 98108681.2 filed in Europe on May 13, 1998; the entire content of which is hereby incorporated by reference.

BACKGROUND OF THE INVENTION

1. Field of the Invention

The invention relates to a method and a device for increasing a data throughput in network applications for the transmission of data at high speed via a packet oriented cordless data network.

2. Background Information

A known network for the transmission of data at high speed is a packet data network, such as the internet. The internet is a global network consisting of a multitude of individual local networks, which are connected with other networks via fixed lines or switched connections. Moreover, the internet is defined by the use of an internet protocol (IP) and the addressing thereof. An associated protocol family, the so-called TCP/IP (transmission control protocol/internet protocol) is also used in the internet and constitutes an essential feature of the internet. The interconnection by using the internet protocol forms the internet. Furthermore, the internet is not maintained or controlled by a central place. Specific servers take care of the international routing. The structure of the network as such cannot be illustrated and is unknown due to the unplanned grown structure. The path of data packets to be transmitted can, therefore, not be predetermined. They are passed on from router to router, whereby now and then also detours are made. Since also consecutive data packets in an application can take different paths, consecutively sent data packets are received at the target address at different times.

The delivery of data packets in the internet and their sequences are guaranteed by the TCP (transmission control protocol) service. The receiver submits positive receipts to the transmitter, or the repetition of damaged or lost data packets is demanded. All data packets sent are continuously numbered for being able to recognize the loss of individual data packets or to newly demand lost data packets. On the receiving side the data packets are reassembled. As the internet protocoll (IP) is based on the connectionless transport of data, individual data packets can get lost during the transport or can reach the receiver in the wrong order. One task of the TCP is to repeat data packets unless the receipt is acknowledged within a specified time ("Technik der Netze"; G. Siegmund; R. v. Decker's Verlag; Heidelberg 1996; Chapter 6).

In network applications for the transmission of data at high speeds via a packet oriented data network the data packets, for instance, are held at an intermediate node between the two networks, where they are lined up in a waiting queue due to the different bandwidth of the networks, and corresponding to their time of receipt they are made available for further transmission. According to the explanations in the prior art a data packet is requested anew every time its receipt is not acknowledged within a specified time. It is, however, possible that the data packet has already been received in the intermediate node, but that it is available for further transmission in the wrong sequence, i.e. at a later time. The repeated request consequently causes an additional and unnecessary burden, as the missing data packet already exists, waiting for further transmission in the waiting queue.

Furthermore, when requesting the transmission of one or more missing data packets, the newly transmitted data packet becomes last in the sequence, which is why a so-called time-out can occur. The time-out results in the stop of the transmission. In order to restart the transmission after such a time-out a starting mechanism is required, which is slow and whereby the data throughput is reduced altogether.

SUMMARY OF THE INVENTION

It is, therefore, the object of the present invention to provide a method and a device by means of which the unnecessary repeated request for data packets as well as time-outs are avoided.

It is an advantageous aspect that an unnecessary burden is avoided in that already existing data packets need not be requested anew, wherein the data throughput is reduced.

It is, moreover, advantageous that the data throughput is increased by avoiding time-outs.

It is another advantageous aspect of the invention that data packets are already sorted at an intermediate node, thereby being available for further transmission in a sorted manner.

According to the present invention it is especially advantageous that the data packets are sorted at any time, wherein a new request can be avoided at any time.

It is, moreover, advantageous according to the present invention that a certain number of data packets is sorted and that a new sorting process takes place again only after said data packets have been transmitted. Accordingly, the sorting process is further optimized.

BRIEF DESCRIPTION OF THE DRAWINGS

In the following the invention is explained in more detail by means of embodiments and the Figures, wherein.

DETAILED DESCRIPTION OF PREFERRED EMBODIMENTS

Figure 1:
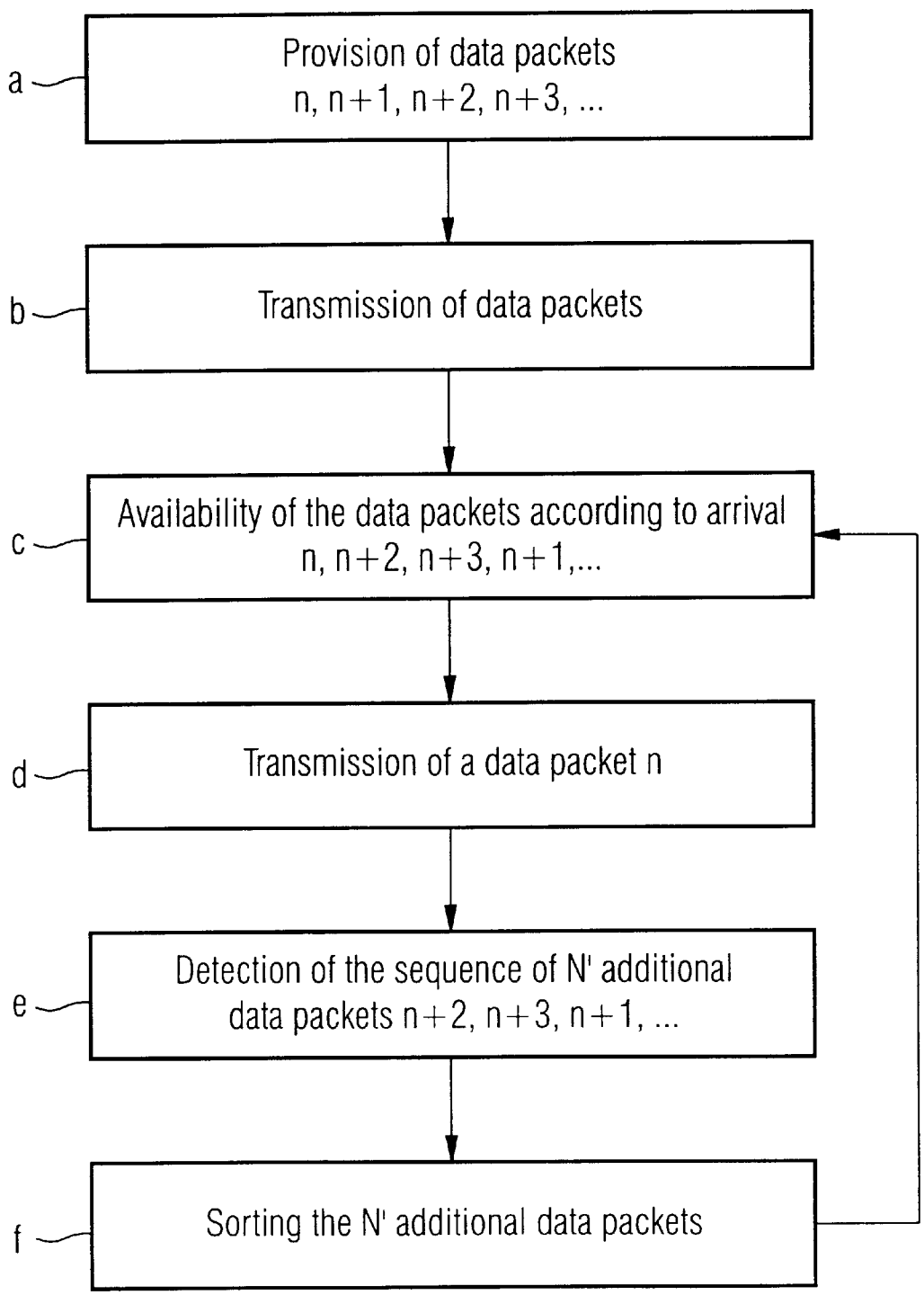
FIG. 1 is a timing diagram of an inventive method according to one embodiment

FIG. 1 is a timing diagram of an inventive method according to one embodiment.

In the following the invention is explained in more detail by means of an embodiment and FIG. 1.

In network applications for the transmission of data at high speeds, such as the internet, data are provided in the form of data packets. The data thereby consist of a multitude of consecutive data packets n,n+1,n+2,n+3, . . . . A further transmission and provision of the data packets in a packet oriented cordless data network, such as a GPRS network, results in data packets of the network for data transmission at high speed being made available for their transmission in a faster way than they are sent by the cordless packet oriented data network due to the different bandwidth of the networks, Accordingly, there is a number of data packets available for further transmission. Due to the kind of transmission of the data packets in the internet, as was already explained in detail in the prior art, data packets are received by the cordless packet oriented data network in different sequences, data packets are incorrectly transmitted and requested anew, or individual or several data packets even get lost, which upon a new request, are also made available in the wrong sequence.

According to FIG. 1, data packets n,n+1,n+2,n+3, . . . are provided by the application in a first step a, by subdividing the data in a number of consecutive data packets. The data packets n,n+1,n+2,n+3, . . . are transmitted to the cordless packet oriented data network in another step b. In correspondence with the arrival, the data packets are made available for transmission in the cordless packet oriented data network in a next step c. In the selected example, the data packets are received in the sequence n,n+2,n+3, n+1, . . . . Accordingly, the data packet n+1 is received with delay.

In a following step d, a data packet n is transmitted. This corresponds to a first data packet made available for transmission. The use of a first data packet is only an example, as each further data packet is also transmitted. The transmission of the data packets is effected preferably directly after the receipt and the provision of the data packets. As, however, for the before-mentioned reasons a transmission via the cordless packet oriented data network takes longer due to the smaller bandwidth, the first data packet is still being sent while the other data packets have already been made available for transmission. This continues to apply also when transmitting each further data packet by making a number of data packets available for transmission.

In a next step e, the order of N' additional, i.e. the already available data packets is determined. The method of determining the order of the data packets will be explained in more detail in the following description. As was already explained above, the N' additional data packets are made available, for instance, in the sequence n+2,n+3,n+1, . . . . Accordingly, it is determined when detecting the sequence, that the next available data packet n+2 has to follow the data packet n. It is, moreover, determined that the further available data packet n+3 has to follow the data packet n+2. When checking the next available data packet n+1 it is determined that said data packet does not have to follow the data packet n+3, and it is determined that the data packet does not have to follow the data packet n+2, but has to follow data packet n according to the sequence made available by the application. In a further step f, the N' data packets are sorted corresponding to the sequence. Accordingly, the data packet n+1 is sorted to be at the right place behind the data packet n and before the data packet n+2. This is done, for instance, by recopying the data packets. Any further possible sorting is to be covered hereby as well, such as, for example, by placing pointers on data packets.

Accordingly, the sorted data packets are made available for the transmission via the cordless packet oriented data network in the correct sequence according to step c.

The above-described method sorts both, data packets being received in the wrong sequence and data packets that have been damaged or got lost and which are requested anew. As was explained above, data packets can be lost or made available in a damaged state. A lost or damaged data packet is requested anew and is accordingly made available anew. This, however, also results in the data packets being made available in the wrong sequence, which is why the newly requested data packet is also sorted in.

It is also possible that several data packets have been lost, namely either directly consecutive ones or data packets being farther apart. The request for one or more lost data packets is, for instance, a mechanism TCP (transmission control protocol).

Since during the sorting process already further data packets have been received, the new data packets and also the already sorted data packets are sorted anew according to an embodiment, after the sequence of the further data packets has been determined. Accordingly, the data packets which have been made available in step c are sorted at any time, i.e. data packets being received are already directly sorted correctly.

In another embodiment a number of data packets already existing while a first data packet is being transmitted is sorted first. Said data packets are made available for the further transmission in the correct sequence, i.e. the sequence corresponding to the application. A further sorting process is accordingly necessary only, once said data packets have all been transmitted, with the result that, for instance, after transmission a number P' of data packets, the sequence is determined anew, whereupon a new sorting process takes place, for example, P'=N'−1, with N'=2,3,4, . . . .

Steps d and e according to the exemplarily explained process can be exchanged as desired. Thus, a determination of the sequence of the further data packets according to step e is feasible already prior to transmitting the first or any further data packet according to step d.

Figure 2:
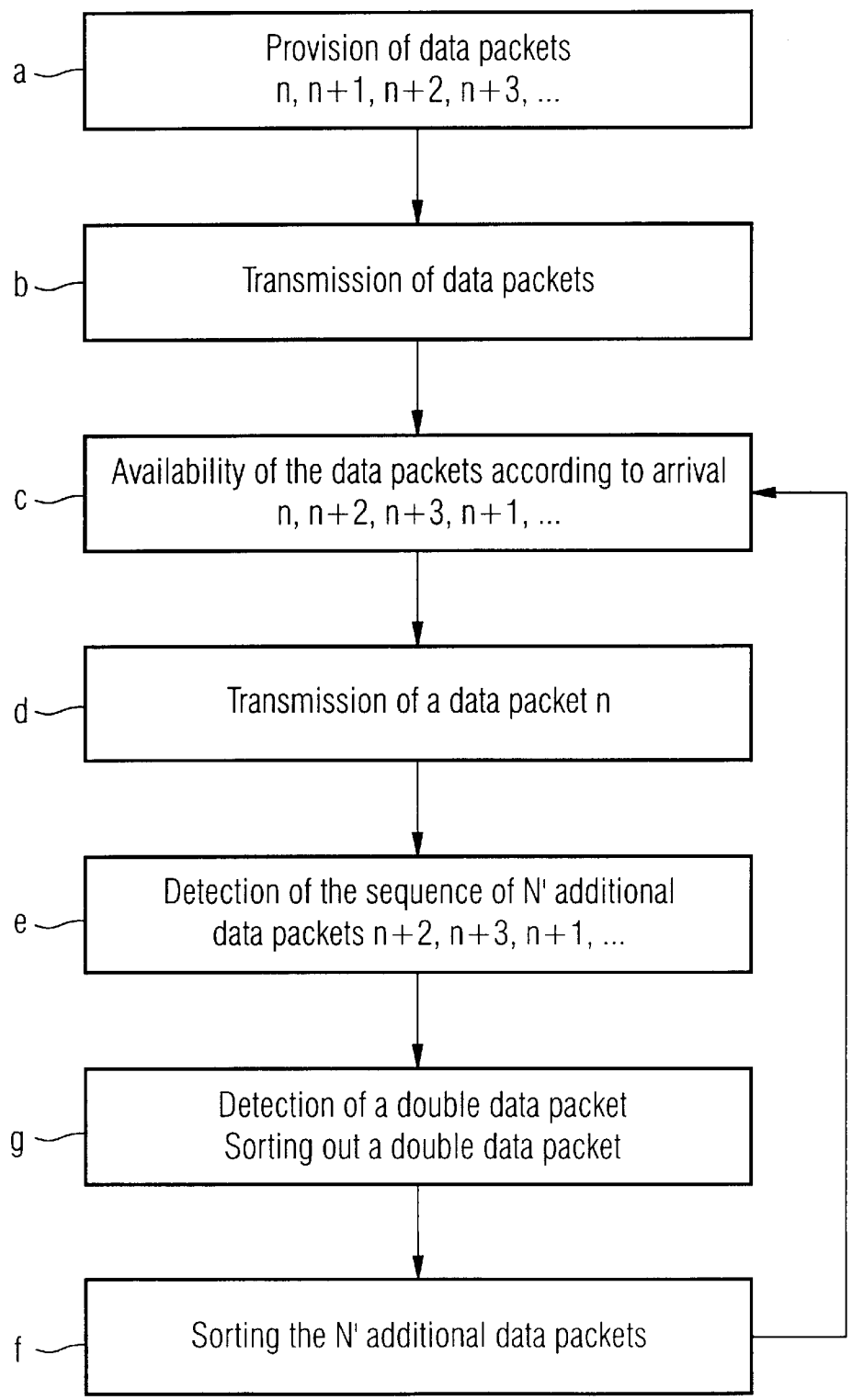
FIG. 2 is a timing diagram of an embodiment of the inventive method according one embodiment

FIG. 2 is a timing diagram of an embodiment of the inventive method according to one embodiment.

In the following, an embodiment of the present invention is explained in more detail by means of FIG. 2.

A method according to the present invention also comprises steps a to e, as explained in conjunction with FIG. 1. In addition to the detection of the sequence according to step e, it is determined whether a data packet exist multiple times in—step g. A data packet existing mutiple times can result from that a data packet has been requested anew although it had not been lost but made available with delay only. It happens, for example, that a data packet is received with such a delay that it has already been recognized as being lost and has been requested anew. After the newly requested data packet is made available and the delayed data packet is received, a certain data packet is available twice.

Such a data packet being available twice is detected in step g, and one of the data packets is sorted out. The remaining data packet is sorted according to step f and is thereupon available in a sorted sequence according to step c.

In the following, a possible application of the invention is explained in more detail by means of an embodiment.

A possible field of application of the invention can be seen in the field of internet applications via, for instance, a cordless packet oriented data network, e.g. GPRS (general packet radio service) or UMTS (universal mobile telecommunications system). One application is thereby to be seen also in the field of all packet oriented networks, i.e. also the cord-dependent packet oriented networks. In the following, mainly cordless packet oriented data networks are concerned. A possible internet application could, for example, be the provision of World-Wide-Web pages, in short WWW pages.

Figure 3:
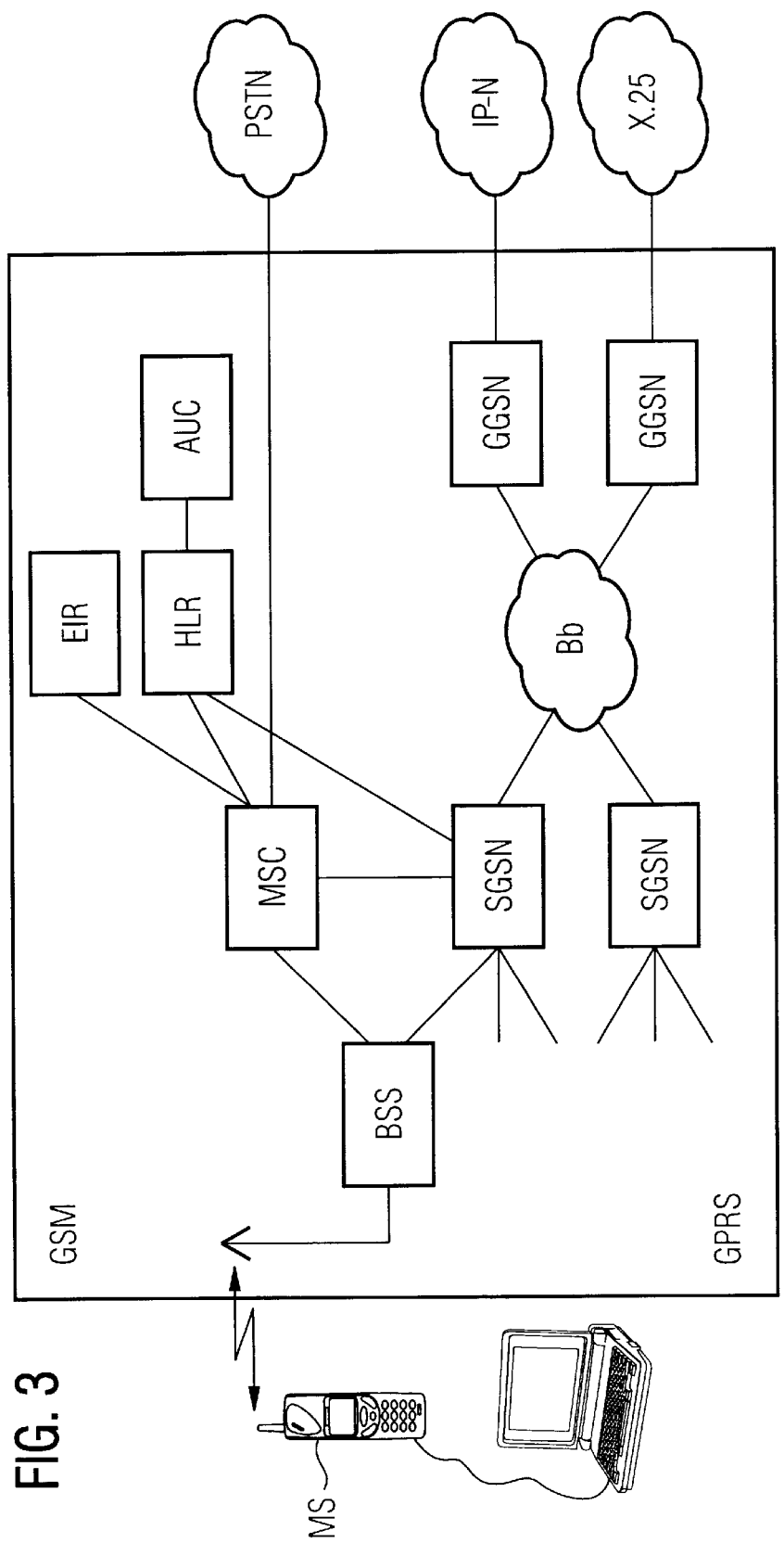
FIG. 3 is a GPRS architecture.

FIG. 3 is a GPRS architecture.

In the following, the architecture of the GPRS network is briefly explained by means of FIG. 3. A mobile subscriber MS, for example, comprises a portable personal computer and a mobile phone or a mobile unit. The PC and the mobile phone are connected to each other either via a cable or also via a cordless connection. The mobile subscriber is connected to the GPRS network. A GPRS network according to the FIGURE is illustrated in connection with a GSM (global system for mobile communication) network. This corresponds to reality in as far as a GPRS network uses individual units and memories of the GSM network. Both have a base station subsystem BSS in common, which is used by both networks. The mobile subscriber MS is connected to the network via the base station subsystem BSS. The GSM network further comprises a mobile radio switching center MSC which is connected to the base station subsystem BSS and via which the GPRS network is connected to the GSM network. Also, a connection to a public telephone network PSTN is produced via the mobile radio switching center. The GSM network further comprises a device data base EIR and a home location register HLR with a certification file (authentification file) AUC. Said files have been mentioned in this respect for the sake of completeness, since the GPRS network receives and uses data from these files.

The GPRS network comprises further one or more GPRS serving GPRS support nodes, hereinafter briefly called SGSN nodes. The SGSN nodes are connected to one or more network transition GRPS support nodes GGSN (gateway GPRS support node), hereinafter briefly called GGSN nodes, via a so-called backbone network Bb. The GGSN node produces a connection to further networks, such as, for instance, to a network X.25 working according to the X.25 standard or to a net building up on the internet protocol structure.

A user of such an architecture is, for example, the user of the PC like in the example explained the user of a portable PC. The portable PC is connected to the GPRS network via a mobile terminal MS or via a corresponding further connecting possibility. The user now wishes to get an internet application displayed on his PC. Said application is, for instance, available in the Internet IP-N or in the network X.25 working according to the X.25 standard.

The internet makes the application as data available in the form of data packets. Said data packets are made available at the SGSN node as an intermediate node.

An authorization for calling services and an authorization for dialing into the networks is made possible through the files in the GSM network. Since this does not constitute an essential criterion for the invention but is rather known from the authentification and identification in the GSM network, this issue is not be entered into in much detail, but rather are the mechanisms known in the GSM network to be included in this respect for the use also via GPRS.

In the following, a protocol structure will be explained (without FIGURE) supporting the sorting process of data packets.

As explained above, the GPRS network comprises a service gateway support node SGSN. Said nodes are subdivided into different layers, which are already known from the field of ISDN. The before-mentioned GPRS support node also comprises, just like the mobile station MS, the base station subsystem BBS and a computer interface, a layer division on the internet side. An LLC (logical link control) protocol being in the mobile station MS and in the SGSN node, thereby produces a logical connection between the station and the SGSN node. The LLC protocol, for instance, works in a modus in which a receipt is acknowledged, a so-called acknowledged modus. Said modus assures the correct transmission of the data. This is, for example, effected by requesting a new request for a data packet by means of said LLC protocol.

Figure 4A:
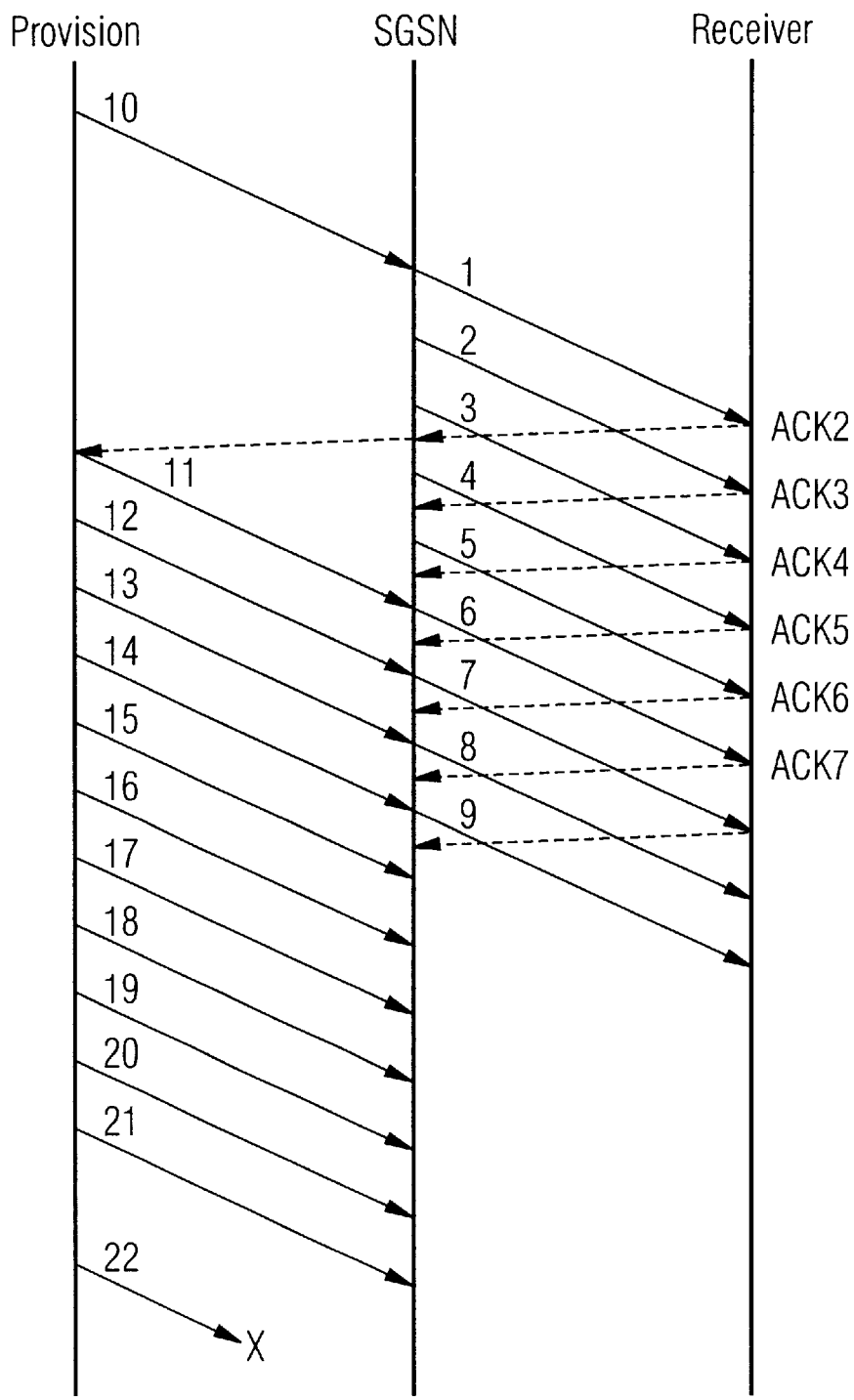
FIG. 4a and 4b illustrate an embodiment with lost data packets.
Figure 4B:
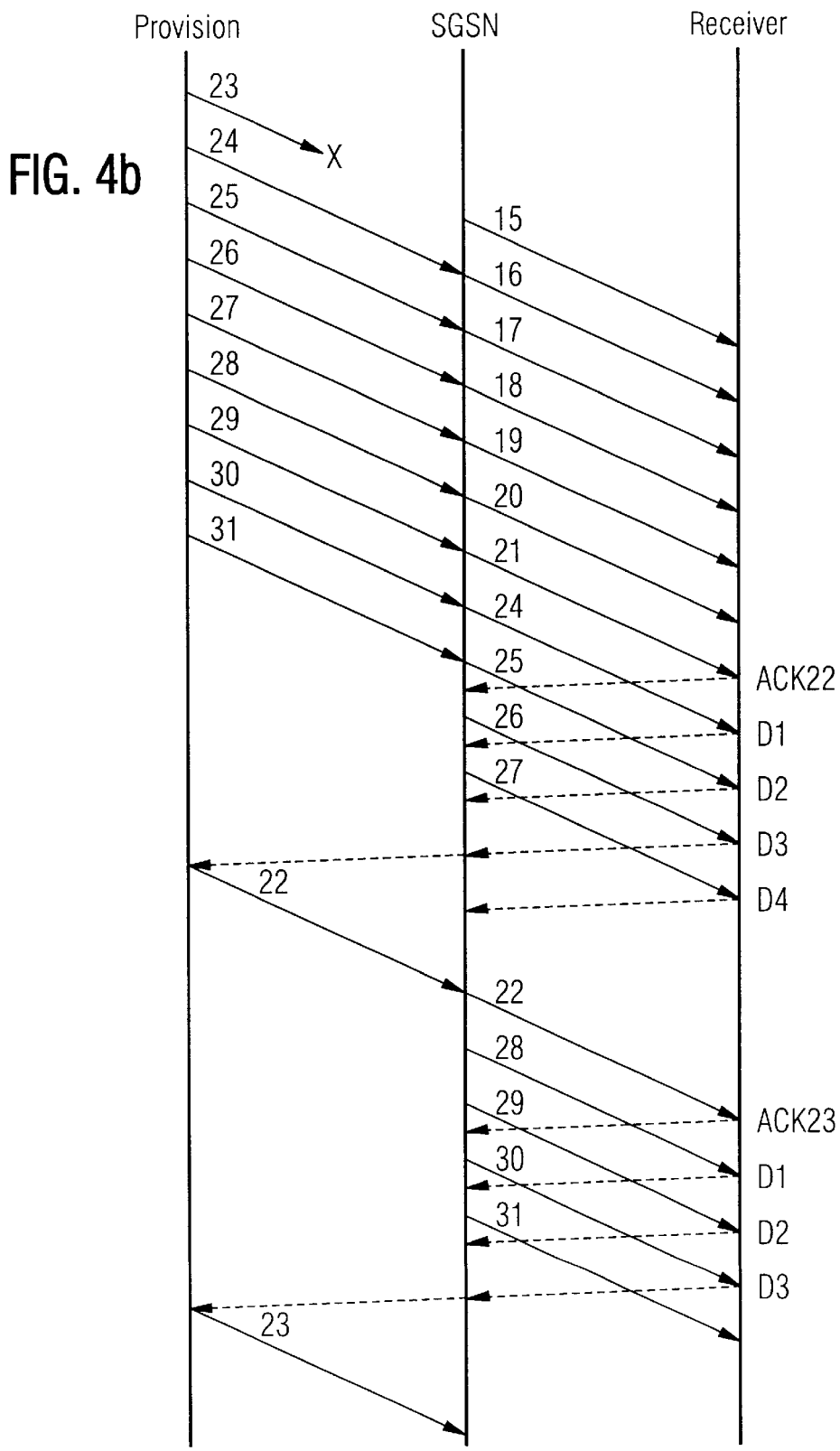

FIG. 4a and 4b illustrate an embodiment with lost data packets.

In the following, an embodiment of the invention is explained in more detail by means of FIGS. 4a to 4b. In this respect the invention is explained in detail, in case that one or more data packets get lost and are, therefore, not available for transmission. As explained above, upon detecting that one data packet is missing a new data packet is requested and is available for transmission in the wrong sequence.

In all parts of the Figures a data packet is illustrated by arrows having a specific number. The arrows are consecutively numbered. The numbering of the arrows, which for the sake of simplicity have been selected as simple natural numbers, indicates which data packet is available from a multitude of data packets. Moreover, a short arrow is illustrated, ending in a cross X. This has been illustrated for indicating that a data packet has not been made available for transmission, i.e. it got lost or damaged. In the illustration the number 22 exemplarily designates the lost data packet.

Also, an interrupted arrow in all parts of the Figures indicates that an acknowledgment on the receipt of the data packet is being transmitted. This is hereinafter called acknowledgment. An acknowledgment indicates, for instance, according to TCP which further data packet is expected by the receiver waiting for transmitted data packets. Thus, for example, the receiver of the successfully transmitted data packet 1 waits for the transmission of data packet 2, which he acknowledges by sending an acknowledgment ACK including a so-called acknowledgment number ACK2. It is to be noted in this respect, that the receiver always sends an acknowledgment for the next data packet according to the sequence, i.e. after a first data packet 1 always to 2, after a second data packet 2 always to 3 etc. If a data packet being wrong in sequence is successfully received it is stored by the receiver, however, an acknowledgment to the next data packet is not released. Instead an acknowledgment to the missing data packet is released.

FIG. 4a shows that data packets are transmitted from a data transmission network of high speed, for instance, the internet. This is indicated by arrows from the left-hand side, the side from which the data packets are provided, to the center. Data packets 10 to 21 are illustrated. Also, data packets 1 to 9 have already been made available, which, however, have not been illustrated for having a better view. In an application from the internet via a cordless packet oriented data network, for instance, the GPRS network, data packets are made available for transmission due to the different bandwidth, without them being transmitted directly. The number of data packets available for transmission is determined by a specified window size F. Said window size F and the application thereof is a mechanism known from the internet. The window size F has here selectively been specified with 10, i.e. the size of 10 data packets. Accordingly, 10 data packets are made available for transmission waiting to be transmitted. Further data packets exceeding the number of 10 are not made available for transmission, as the system, as soon as it is in a so-called transient state (self clocking), makes available one further data packet only, even if a data packet has successfully been transmitted via the GPRS network and the pertinent acknowledgment has correctly been received. This is indicated by the acknowledgment ACK2 of the second data packet allowing for a further data packet 11 to be made available, as one data packet, namely the first, was successfully received.

The transmission of a first data packet via the cordless packet oriented data network, i.e. the GPRS, is indicated by the arrows from the center to the right-hand edge—the receiving side. The vertical line in the center hereby indicates an SGSN node (intermediate node), i.e. a connection node between the internet and the GPRS network. While 10 data packets are already made available by the internet, the first data packet is transmitted via the GPRS network. Once the data packet has arrived, a confirmation on the receipt, the previously explained acknowledgment, is transmitted. This is illustrated by the interrupted arrows from the right-hand side, the receiving side, to the left-hand side. For a better view, the arrows, except for the arrow of acknowledgment 2 ACK2, only lead to the SGSN node. Once the receipt of a data packet is acknowledged, another packet is transmitted. According to FIG. 4a the acknowledgment 2 ACK2 is sent after the transmission of the first data packet. In other words, the first data packet was successfully transmitted and the second data packet is expected.

It is illustrated in FIG. 4b that in addition to the data packet 22, a data packet 23 gets lost during transmission. The further data packets 24 to 31 again are made available for transmission. Further data packets are sent from the SGSN node being data packets 15 and the following ones. For a better view, not all acknowledgments have been indicated.

After the transmission of data packet 21 it is acknowledged by ACK22 in accordance with which the transmission of data packet 22 is expected. As data packet 22 is not available whereas data packet 24 is available for transmission, said data packet is transmitted as the next one in the available sequence. As data packet 22, however, is still missing for completing the transmission, and, as was explained above, the successful transmission of data packet 24 is not acknowledged before data packet 22 has been received, a repeated acknowledgment with the request for transmitting data packet 22 is sent—the so-called duplicate acknowledgment D1. The 1 hereby stands for the new request for sending the data packet. In the following, each further acknowledgment with the request for sending a data packet will briefly be called request.

After the transmission of data packet 25 a second repeated request (duplicate acknowledgment) D2 is sent, and after the transmission of data packet 26 a third repeated request (duplicate acknowledgment) D3 is sent. After a third consecutive repeated request (duplicate acknowledgment) D3 it will be assumed that data packet 22 got lost, and the missing data packet 22 is requested anew. The fact that the data packet is requested anew after the third repeated request is a specification as is, for instance, selected in TCP. A method for newly requesting is here, for example, the so-called fast retransmit algorithm.

Accordingly, after the receipt of data packet 26, data packet 22 is requested anew. Data packet 22 is then available for transmission after the transmission of data packet 27, which in the meantime has been transmitted by releasing a further repeated request D4.

According to the invention data packet 22, which in the sequence is received behind data packet 31, is then sorted in. It is determined by means of the sorting process that data packet 22 comes before data packet 31 in the sequence, just like before data packets 30 and 29 and 28. As data packet 27 is the one momentaneously being transmitted, data packet 22 is sorted in before data packet 28. After the transmission of data packet 27 is over, data packet 22 is ready for transmission.

As data packet 23 equally has not been transmitted as yet, as was explained above, a request for transmission of data packet 23 is sent ACK23. For this purpose, as was explained above in view of data packet 22, again three repeated requests D1, D2 and D3 are sent before data packet 23 is requested anew. This will be available afterwards and can directly be transmitted after being available and after data packet 31. After data packet 23 is successfully received, it is compared in a memory on the receiving side as to which data packet has already been received, in this case the data packets up to data packet 31. Thereupon further new data packets going beyond 31 will be requested by releasing an ACK32.

For the sake of completeness it should be mentioned that, in particular with TCP, the window size F is calculated anew in case of a repeated request. This serves to prevent an overload of the network if too large a number of data packets is available for transmission without sending them. The new window size F' is calculated as follows. The old window size F is divided into 2 and added with a constant value k.

$F'=F/2+k$ with F=old window size k=constant (1)

The constant value is specified with 3.
The example accordingly results in the new window size F' to $F'=10/2+3=8.$ This means that only 8 data packets can be made available for transmission. It can easily be seen that the window size is reduced with every new calculation.

In the present case this means that after data packet 22 has repeatedly been requested, only 8 further data packets can be made available. The number of the possible available data packets is accordingly 22+8=30. As, however, data packet 31 is available, a new data packet going beyond data packet 31 cannot be made available for transmission, as there are already more data packets than allowed, according to the new specification of the window size.

Without applying the invention, data packet 22 would only have been transmitted after the transmission of data packet 31, and in addition, no further data packets going beyond data packet 31 would have been available. As data packet 23 was also missing, this would have resulted in the stop of the transmission, the so-called TCP time-out. Through the sorting process such a stop is prevented.

Figure 5:
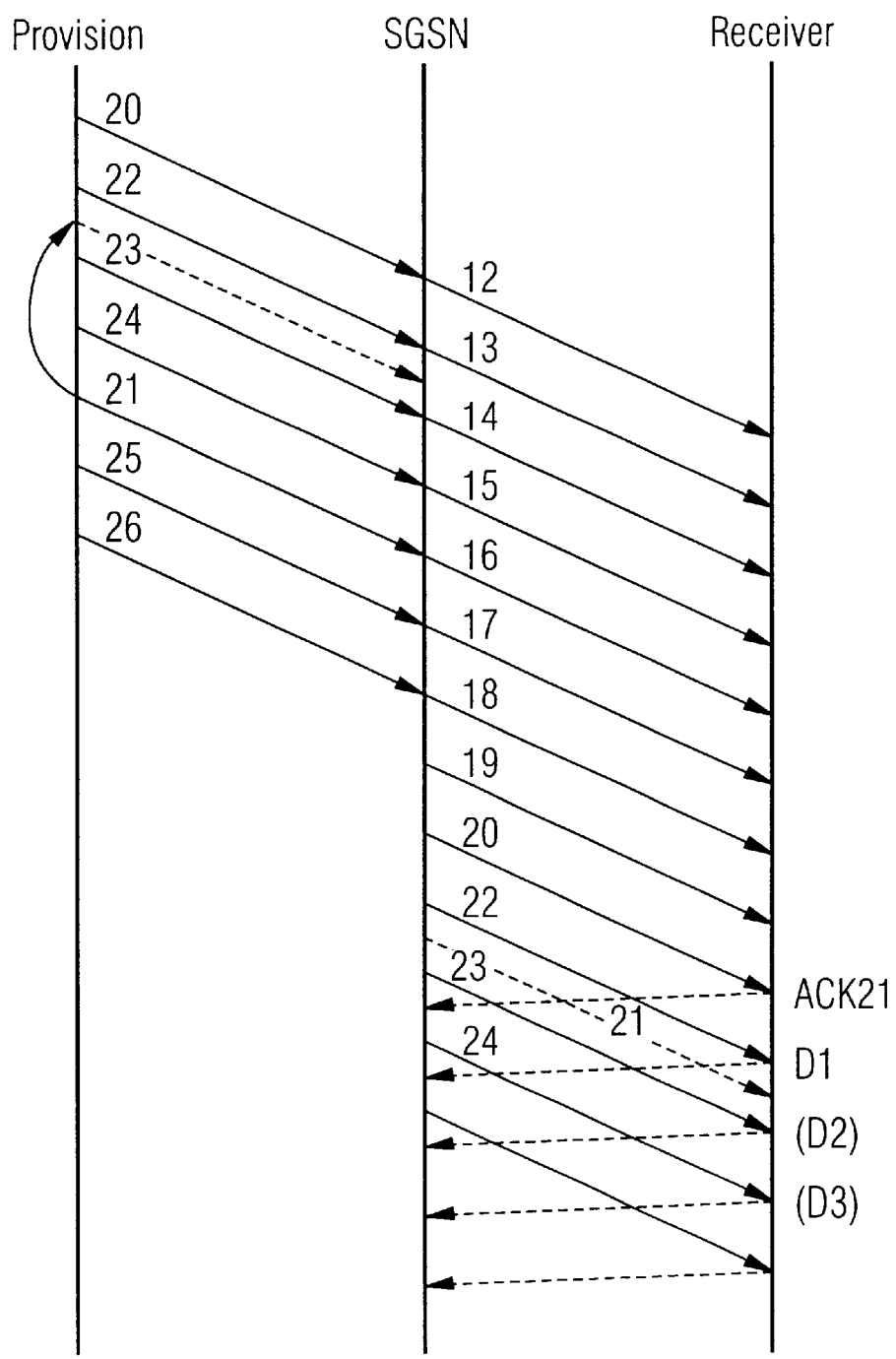
FIG. 5 illustrates an embodiment with data packets in wrong order.

FIG. 5 illustrates an embodiment with data packets in wrong order.

In the following, another embodiment of the invention is explained by means of FIG. 5 in the case, where the data packets arrive incorrectly sorted.

The designations and meanings of FIG. 5 are to correspond to the designations and meanings of FIGS. 4a and 4b. According to FIG. 5 data packets 20 to 26 are shown which are ready for transmission. The sequence has been mixed up as data packet 21 is only received after data packet 24. The SGSN node transmits data packet 21 at the time of providing data packet 20. After data packet 20 is transmitted, the receipt is acknowledged and data packet 21 is requested. If data packet 21 is not ready for transmission, the data packet following in sequence is transmitted first, in this case data packet 22. As was already explained in FIGS. 4a and 4b, so-called repeated requests are subsequently sent, and after a third of such requests in sequence a new request for provision is transmitted. Since in the present case, however, the data packet 21 has not been lost, such a request is not necessary and redundant.

According to the present invention the data packets arriving in the wrong order are sorted according to their numbering sequence, whereby a new request is avoided. This is indicated by the dotted arrow in the FIGURE. According to an embodiment the sorting process is started after the first request for transmitting data packet 21 ACK21. This takes place while the further data packet 22 is already being sent, which is why data packet 21 is sorted in front of data packet 23. Since in accordance therewith a first repeated request D1 has occurred, a new provision does not take place. In the FIGURE it is shown by D2 and D3 placed in parenthesis that this does not take place according to the invention.

It is another embodiment (without FIGURE) that the data packets are sorted at any time. This makes it possible that all data packets are present in the correct sequence at all times and need not be sorted once an error occurs. Also, according to an embodiment, a specified number of data packets can be sorted whereby only after the transmission of so sorted data packets are new data packets sorted again. This can be done either before the transmission of a first or during the transmission of a first data packet.

For the sake of completeness it is mentioned that it may as well happen that data packets are missing and the sequence is incorrect at the same time. In this respect, reference can additionally be made to the method according to FIGS. 4a and 4b.

In the following, sorting mechanisms will be explained (without FIGURE). For sorting the data packets ready for transmission an identification number of each data packet is determined. Said identification number indicates the sequence of the data packets. By means of this identification number the data packets are sorted.

According to an embodiment, a length of the data packet is determined in addition to the identification number. By means of the length the data contents, i.e. the present amount of data is determined.

According to the embodiments a TCP (transmission control protocol) sequence number is used as identification number in internet applications. A sequence of TCP sequence numbers, for instance, is as follows: 1; 1025; 2049; 3073; 4097 etc. In addition there is a priority list by means of which the numbers of the consecutive first bytes are determined, for example, that the 1025 directly follows the 1 without another data packet existing in between. This results in that the 1 indicates the first data packet, the 1025 the second data packet, the 2049 the third data packet etc.

Another possibility of determination is the detection of the TCP sequence number and the so-called IP-total-length information. The IP-total-length information is composed of specified lengths, such as 20 bytes for a header plus 20 bytes for TCP, and the actual data length. 20+20 byte=40 byte are hereby deducted from the IP-total-length information, wherein the length of the data can be detected and information on the following data packet can be obtained.

The previously explained possibilities of determination are also applied to determine a data packet that is available twice or several times. A data packet being available several times is, for example, recognized by means of the TCP sequence number as identification number and can thereby be sorted out.

In the following, the device according to the invention is explained (without FIGURE). A device for increasing a data throughput in network applications for the transmission of data at high speed, such as the internet, via a packet oriented cordless data network, such as an GPRS network, comprises means for providing data in the form of a multitude of consecutive data packets (n,n+1,n+2, . . . ,n+x). The data packets are, for instance, provided in the SGSN node.

Moreover, the device for increasing the data throughput comprises means for providing the data packets in the sequence of their arrival (n,n+2,n+3,n+1, . . . ). This is done as explained above, for instance, in an SGSN node.

Moreover, the device comprises transmission means for transmitting a first and any additional data packet (n,n+1, . . . ) via the packet oriented cordless data network.

Moreover, the device comprises means for sorting additional data packets (n+2,n+3,n+1, . . . ) already being available during the transmission of a first or any further data packet. The data packets are sorted in accordance with the sequence provided by the application, for instance, the internet application. As explained above, the sorting process may take place, for instance, on the LLC protocol level and/or on the SNDCP (subnetwork dependent convergence protocol) level. Again for the sake of completeness it is once more mentioned that with those means a sorting is possible when transmitting a first or any further data packet.

A data packet existing twice or several times is sorted with a means for sorting out double or several times existing data packets. Also, the double or several times existing data packets are detected, for instance, by means of an identification number of the data packet.

In the above examples, the GPRS network was explained as being a cordless packet oriented data network, and the UMTS network was mentioned. However, any other data network, for example, an ATM network, also corresponds to the mentioned packet oriented network and constitutes an application field of the invention.

Moreover, the internet was mentioned in the above examples. Here, too, any other network for the transmission of data at high speeds is to be listed. The internet is presently merely the best known network meeting the respective requirements.

What is claimed is:

1. Method of increasing data throughput for a high speed data network application transmitting a multitude of consecutive data packets via a packet oriented cordless data network, said method comprising the steps of providing the multitude of consecutive data packets from the application for transmission through the high speed data network, said data packets being sorted for transmission in accordance with a sequence provided by the application;

making the data packets available to the packet oriented cordless data network in a sequence of arrival from the high speed data network;

during the transmission of a first data packet via the packet oriented cordless data network, resorting the remaining available data packets by the packet oriented cordless data network in accordance with the sequence provided by the applications, and transmitting the resorted remaining data packets via the packet oriented cordless data network.

2. The method according to claim 1, further comprising the step of, during the transmission of each subsequent data packet via the packet oriented cordless data network, resorting as necessary, all remaining available data packets prior to transmitting the resorted remaining data packets via the packet oriented cordless data network.

3. The method according to claim 1, further comprising the step of determining an identification number of each data packet when each packet arrives in the packet oriented cordless data network, and resorting the data packets in the sequence provided by the application according to the identification number of each packet.

4. The method according to claim 1, wherein data packets of a known total length are transmitted, and after making the data packets available to the packet oriented cordless data network, the method further comprises the steps of:

determining an identification number of a particular data packet;

determining a data field length of the particular data packet by subtracting a header length and an identification number length from the known total packet length; and determining information regarding a data packet following the particular data packet based upon the determined length of the data field.

5. The method according to claim 1, wherein the high speed data network is the internet, and the application is an internet application.

6. The method according to claim 5, wherein the packet oriented cordless data network is a General Packet Radio Service (GPRS) network.

7. The method according to claim 5, wherein the packet oriented cordless data network is a Universal Mobile Telecommunication System (UMTS) network.

8. The method according to claim 6, wherein the step of resorting the remaining available data packets by the packet oriented cordless data network is performed in a Serving GPRS Support Node (SGSN) on a Logical Link Control (LLC) protocol level and/or a Subnetwork Dependent Convergence Protocol (SNDCP) level.

9. The method according to claim 3, wherein the step of determining an identification number of each data packet includes determining, a Transmission Control Protocol (TCP)sequence number.

10. The method according to claim 4, wherein the total length of the data packets is determined from Internet Protocol (IP)-total-length information.

11. The device according to claim 10, wherein the packet restoring means includes means for sorting out data packets.

12. The device according to claim 11, wherein the packet resorting resorting means includes means for determining an identification number of each delivered data packet, and resorting the delivered packets in the sequence provided by the application according to the identification number of each delivered packet.

13. A device for increasing data throughput for a high speed data network application transmitting a multitude of consecutive data packets via a packet oriented cordless data network, said device comprising:

packet sorting means for providing the multitude of consecutive data packets from the application for transmission through the high speed data network, said data packets being sorted for transmission in accordance with a sequence provided by the application;

packet delivery means for making the data packets available to the packet oriented cordless data network in a sequence of arrival from the high speed data network;

packet resorting means within the packet oriented cordless data network for resorting the delivered data packets in accordance with the sequence provided by the application, said resorting means resorting remaining data packets during the transmission of a first data packet via the packet oriented cordless data network and cordless transmission means for transmitting the resorted data packets via the packet oriented cordless data network.

14. The device according to claim 12, where the packet resorting means also includes means for detecting a length of a data packet.

* * * * *